United States Patent [19]

Kelsey

[11] Patent Number: 4,638,044

[45] Date of Patent: Jan. 20, 1987

[54] PROCESS FOR PREPARING POLY(ARYL ETHER KETONE)S

[75] Inventor: Donald R. Kelsey, Hillsborough, N.J.

[73] Assignee: Amoco Corporation, Chicago, Ill.

[21] Appl. No.: 713,845

[22] Filed: Mar. 20, 1985

[51] Int. Cl.$^4$ ................................................ C08G 8/02
[52] U.S. Cl. ...................... 528/125; 528/126; 528/128; 528/174; 528/175; 528/219
[58] Field of Search ............. 528/125, 126, 128, 174, 528/175, 219

[56] References Cited

U.S. PATENT DOCUMENTS

| | | | |
|---|---|---|---|
| 3,941,748 | 3/1976 | King | 528/125 |
| 4,169,178 | 9/1979 | Freeman | 528/126 |
| 4,176,222 | 11/1979 | Cinderey et al. | 528/126 |
| 4,320,224 | 3/1982 | Rose et al. | 528/125 |

Primary Examiner—Lucille M. Phynes
Attorney, Agent, or Firm—Donald M. Papuga; William T. McClain; William H. Magidson

[57] ABSTRACT

Described herein is an improved process for preparing poly(aryl ether ketone)s by reacting a mixture of at least one bisphenol and at least one dihalobenzenoid compound or halophenol, wherein the improvement comprises providing to the reaction, a combination of sodium carbonate and/or bicarbonate and an alkali metal halide selected from potassium, rubidium or cesium fluoride or chloride, or combinations thereof.

11 Claims, No Drawings

PROCESS FOR PREPARING POLY(ARYL ETHER KETONE)S

TECHNICAL FIELD

This invention is directed to an improvement in the process for preparing poly(aryl ether ketone)s by the reaction of at least one bisphenol and at least one dihalobenzenoid compound, or a halophenol. The improvement comprises providing to the reaction sodium carbonate and/or bicarbonate and an alkali metal halide selected from potassium, rubidium or cesium fluoride or chloride, or combinations thereof.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (viz. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Attwood et al., Polymer, 1981, vol 22, August, pp. 1096-1103; Blundell et al., Polymer, 1983 vol. 24, August, pp. 953-958, Attwood et al., Polymer Preprints, 20, no. 1, April 1979, pp. 191-194; and Rueda et al., Polymer Communications, 1983, vol. 24, September, pp. 258-260. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the phenylene units in the structure are assumed.

Thus PAEKs are well known; they can be synthesized from a variety of starting materials; and they can be made with different melting temperatures and molecular weights. Most of the PAEKs are crystalline and at sufficiently high molecular weights they are tough, i.e., they exhibit high values ($>50$ ft-lbs/in$^3$) in the tensile impact test (ASTM D-1822). They have potential for a wide variety of uses, and their favorable properties class them with the best of the engineering polymers.

Some PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes tend to be brittle and thermally unstable. In contrast PAEK's made by nucleophilic aromatic substitution reactions are tough crystalline polymers. Nucleophilic aromatic substitution reactions for producing PAEK's are described in the following references:

Canadian Pat. No. 847963 describes a process for preparing polyarylene polyethers. The process comprises contacting equimolar amounts of a dihydric phenol and a dihalobenzenoid compound and at least one mole of an alkali metal carbonate per mole of dihydric phenol. The dihydric phenol is in situ reacted with the alkali metal carbonate to form the alkali metal salt thereof and the formed salt reacts with the dihalobenzenoid compound to form the polyarylene polyether in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali of higher atomic number per gram atom of sodium. The process is stated to take place faster when the combination of sodium carbonate or bicarbonate and the second alkali metal carbonate or bicarbonate are used. Also the products are stated to be of high molecular weight using such a combination.

The patent describes in Example 17 that when the reaction is carried out using only sodium carbonate, a polymer is obtained having a reduced viscosity of 0.60 dl/g as measured in concentrated sulfuric acid at 25° C. at a concentration of 1 gm/100 ml. However, it is stated in the patent that when the polymer was compression molded into a film, the film was brittle and dark grey in color. In Example 18 of the patent, the polymerization was carried out using potassium carbonate instead of sodium carbonate and a high molecular weight polymer was produced (reduced viscosity of 1.55 as measured in concentrated sulfuric acid at 25° C. at a concentration of 1 gm/100 ml). However, the polymer was stated to contain a quantity of gel and also, the reaction vessel had acquired a black coating. In Example 19 of the patent, a mixture of potassium carbonate and sodium carbonate was used. The patent stated that the polymer produced had a high reduced viscosity and a tough off-white film was formed from it. Also, no gel was present in the polymer and the reaction vessel had not become discolored.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) be at least twice the number of phenol (—OH) groups. The examples show it to be, in general, a slow process. It is not one which is suitable per se for making PAEKs, see Control E, infra.

Imai, et al in Makromol Chem., 179, 2989-2991, 1978 describe the preparation of polysulfones in dipolar aprotic solvents using at least 500 mole % of potassium fluoride based on the bisphenol. The process uses relatively low temperatures (about 100° C.) to avoid polymer degradation but requires very long reaction times (48-70 hours).

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen containing reactants. The patent states that the process gives faster reactions and higher molecular weights and less colored polymers than a process using potassium fluoride in place of potassium carbonate.

Thus, although potassium fluoride alone can be used for preparing PAEs it is alleged not to be effective enough since it requires long reaction times, does not result in high molecular weight and provides more than the desired amount of color in the PAE. In addition, it is not effective in the nucleophillic substitution reaction for forming PAEKs. Potassium fluoride in large concentrations is highly corrosive making selection of materials of construction of reactors expensive.

THE INVENTION

This invention is directed to a process for making various molecular weight poly(aryl ether ketone)s in comparatively shorter reaction times overall than by using potassium fluoride alone or by using a combination of sodium carbonate or bicarbonate and a second higher alkali metal carbonate or bicarbonate.

Specifically, this invention is directed to an improved process for preparing poly(aryl ether ketone)s by the reaction of a mixture of at least one bisphenol and at least one dihalobenzenoid compound, or a halophenol, in which the improvement involves providing to the reaction a combination of sodium carbonate and/or bicarbonate and an alkali metal halide selected from potassium, rubidium or cesium fluoride or chloride, or combinations thereof.

The poly(aryl ether ketone)s of this invention are characterized as including oligomers, polymers, and co- or higher polymers containing repeating units of ether oxygen and keto(carbonyl) interconnected by aromatic diradicals, such as 1,4-phenylene. They may be characterized more specifically by one or more of the following formulae:

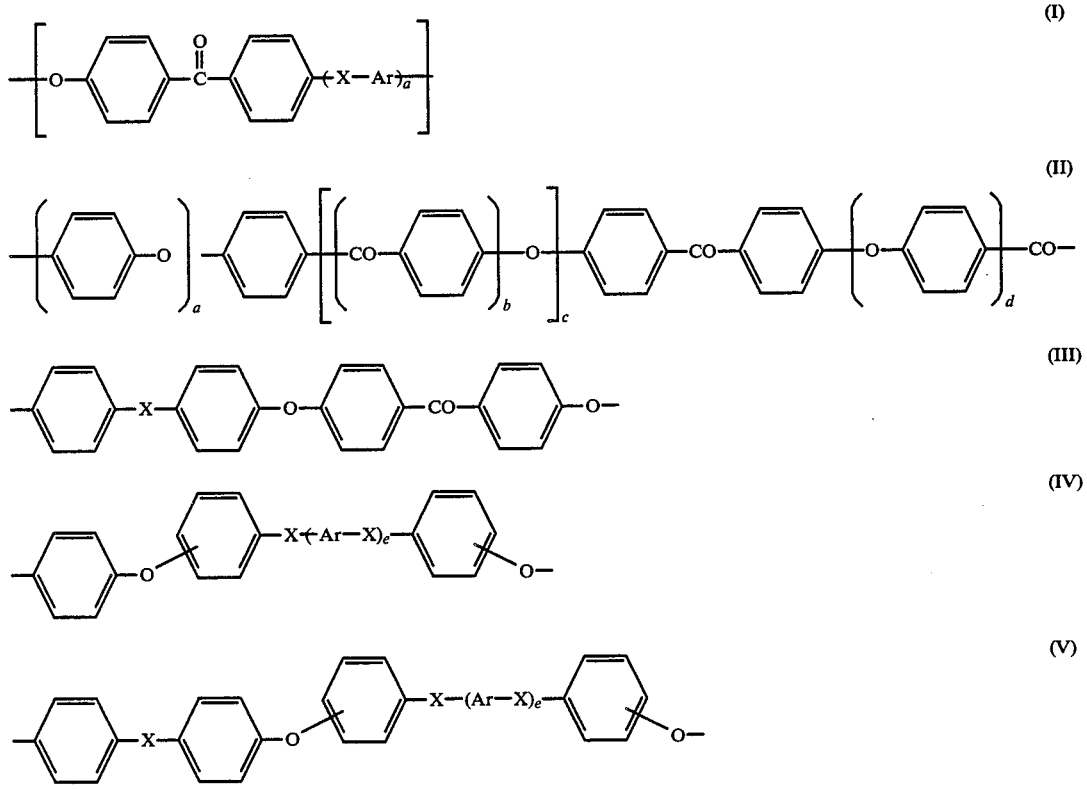

wherein Ar is independently a divalent aromatic radical selected from phenylene, biphenylene, or naphthalene, X is independently O,

$SO_2$, or a direct bond and a is an integer of from 1 to 4, b, c, d and e are 0 to 1 and preferably d is 0 when b is 1.

Preferred poly(aryl ether ketones)s include those having repeating units of the formula:

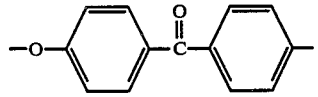

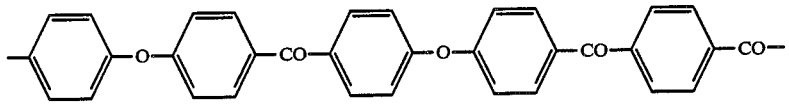

The preferred poly(aryl ether ketone)s may form copolymers with the following:

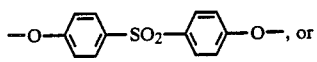 

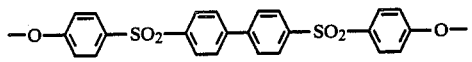

The process is conducted by reacting a mixture (substantially equimolar amounts when maximum molecular weight is sought) of at least one bisphenol and at least one dihalobenzenoid compound or a halophenol. The bisphenols may be depicted as follows:

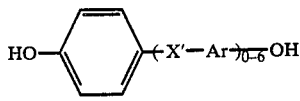

wherein X and X' are independently O, $$\begin{matrix} O \\ \| \\ C, \end{matrix}$$

SO$_2$, or a direct bond and Ar is independently a divalent radical selected from phenylene, biphenylene or naphthalene, most preferably 1,4-phenylene.

The dihalobenzenoid compound may be depicted as follows:

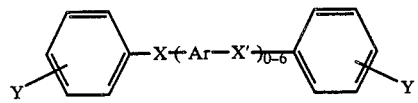

wherein Y is halogen, preferably fluorine or chlorine, the Y's may be the same or different and are ortho or para to the X; Ar, X, and X' are as defined above with the proviso that X or X' ortho or para to the Y's are electron withdrawing groups, i.e., $$\begin{matrix} O \\ \| \\ C \end{matrix}$$

or SO$_2$. In the preferred embodiment, each aromatic radical is para substituted and most preferably, 1,4-phenylene.

The halophenols may be depicted as follows:

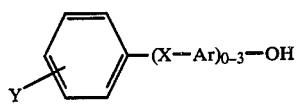

wherein Y, X, and Ar are as defined above with the proviso that the X ortho or para to Y is an electron withdrawing group, i.e., $$\begin{matrix} O \\ \| \\ C \end{matrix}$$

or SO$_2$.

Preferred bisphenols in such a process include:
hydroquinone,
4,4'-dihydroxybenzophenone,
4,4'-dihydroxybiphenyl,
4,4'-dihydroxydiphenyl ether,
4,4'-dihydroxydiphenyl sulfone, and
4,4'-bis(4-hydroxyphenylsulfonyl)biphenyl.

Preferred dihalobenzenoid and halophenol compounds include:
4-(4-chlorobenzoyl)phenol,
4-(4-fluorobenzoyl)phenol,
4,4'-difluorobenzophenone,
4,4'-dichlorobenzophenone,
4-chloro-4'-fluorobenzophenone,
1,4-bis(4-fluorobenzoyl)benzene,
4,4'-dichlorodiphenyl sulfone,
4,4'-difluorodiphenyl sulfone, and
1,3-bis(4-fluorobenzoyl)benzene.

The reaction is carried out by heating a mixture of one or more bisphenols and one or more dihalobenzenoid compounds or halophenols at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium fluoride or chloride employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from alkali metal halide) is used for each phenol group.

-continued
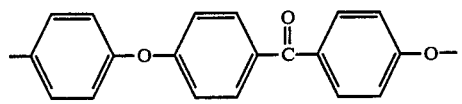
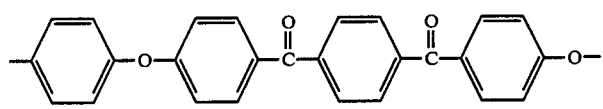
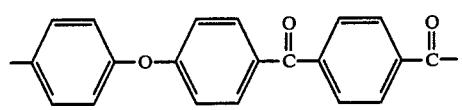
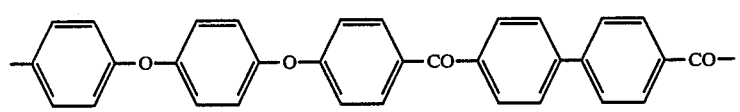
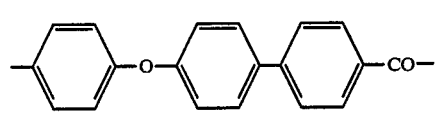
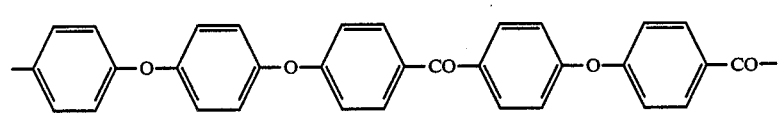
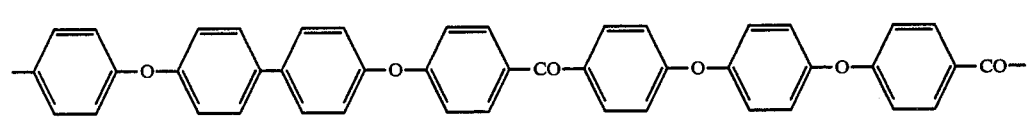
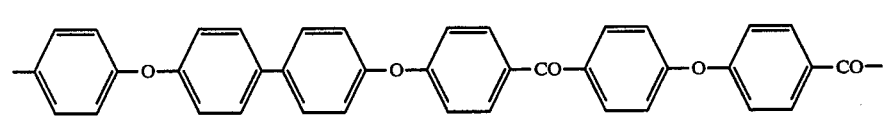
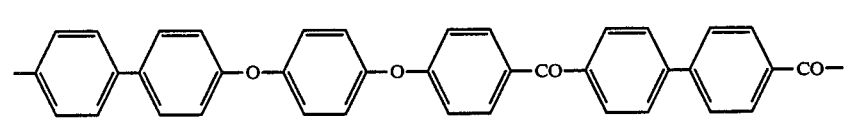
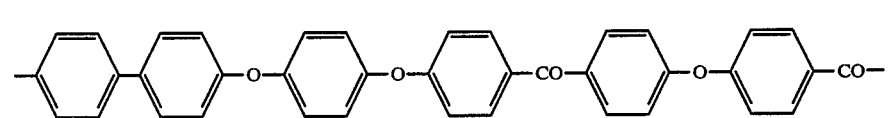
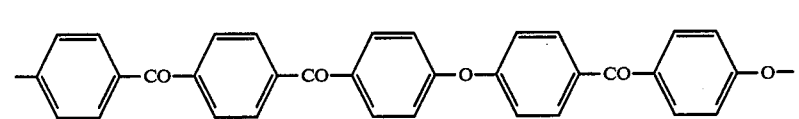
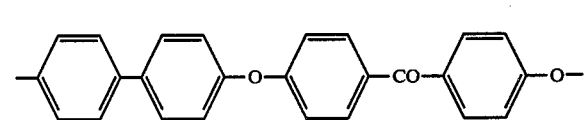
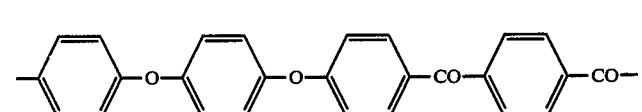
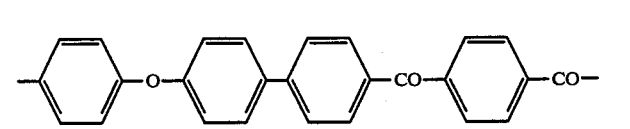

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, it has been observed that the chloride salts are less active than the fluoride salts so that more chloride and less fluoride is used.

Where a bisphenol and dihalobenzenoid compound are employed, they should be used in substantially equimolar amounts when maximum molecular weight is sought. However an excess, up to 5 mole %, of dihalide may be employed if desired. An excess of one monomer over the other leads to the production of low molecular weight products which can be desirable when the process is directed to making lower molecular weight PAEK, for example, for block polymer formation.

The reaction may be carried out in the presence of an inert solvent, or partially in the absence of a solvent, or in the absence of solvent.

Preferably a solvent is employed and is an aliphatic or aromatic sulphoxide or sulphone of the formula

R—S(O)x—R' where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula.

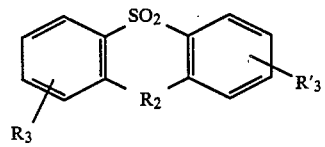

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulphones include diphenylsulphone, ditolyl sulphone, tolylphenyl sulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidinone, N,N-dimethylacetamide, and N-cyclohexyl pyrrolidinone. In another embodiment the reaction is started in a relatively low boiling polar aprotic solvent such as dimethyl formamide, dimethylacetamide, dimethyl sulfoxide, N-methylpyrrolidinone, and the like. Heating at reflux results in the formation of low molecular weight product with attendant precipitation. The solvent may be removed and the low molecular weight product may be advanced if desired by solid state polymerization, i.e. by heating to a temperature in the range of from about 200° to about 400° C.; preferably, an inert atmosphere is maintained during this latter step.

The reaction temperature is in the range of from about 100° to about 400° C. and will depend on the nature of the reactants and the solvent, if any, employed. The preferred temperature is above 250° C. The reactions are preferably carried out at ambient pressure. However, higher or lower pressure can also be used. The reaction is generally carried out in an inert atmosphere.

For the production of some poly(aryl ether ketone)s, it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

The poly(aryl ether ketone)s exhibit a reduced viscosity of from about 0.05 to about 5.0, and preferably, from about 0.1 to about 2.0 dl/g as measured in concentrated sulfuric acid (1 g/100 ml) at 25° C.

The poly(aryl ether ketone)s of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The poly(aryl ether ketones) of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

EXAMPLE 1

A 250-ml, 3-neck (slanted side necks) flask fitted with a SS mechanical stirrer, thermocouple probe and adapter, a Claisen arm with nitrogen inlet tube and condenser was charged with difluorobenzophenone (0.12 moles, 26.18 gm), hydroquinone (0.12 moles, 13.21 gm), sodium carbonate (0.124 moles, 13.14 gm), potassium fluoride (0.03 moles, 1.74 gm, ground and dried) and 95 gm diphenylsulfone. The reaction apparatus was evacuated and filled five times with argon using a Firestone valve connected to the top of the condenser. A flow of ultra high purity nitrogen was then begun through the inlet tube and the Firestone valve replaced with a bubbler. The reaction mixture was heated slowly using a heating mantle and temperature controller until the contents melted enough to begin stirring. The reaction mixture was then heated to 200° C., held 30 minutes; heated to 250°, held 1 hour; heated to 290°, held 30 minutes; and heated to 320°. After about 75 minutes at 320°, the reaction mixture was very viscous and was removed from the reaction flask.

The solid mass was ground in a Wiley mill, and then extracted with 500–600 ml refluxing solvents: acetone (twice), water, 1% aqueous HCl, water, acetone. The polymer was dried in the vacuum oven overnight at 120° to give 30.5 gm polymer (88% isolated yield). The reduced viscosity measured in a solution of 1 gm polymer/100 ml solution in concentrated sulfuric acid at 25° C. was 1.85 dl/gm.

The polymer was compression molded (20 mil) and tested for tensile strength and modulus according to ASTM-D-638, elongation at break according to ASTM-D-638 and pendulum impact strength according to ASTM D-256. The results are as follows:

| | |
|---|---|
| Tensile Modulus (psi) | 354,500 |
| Tensile Strength (psi) | 12,400 |
| Elongation (%) | 20.2 |
| Pendulum Impact Strength (ft-lb/in$^3$) | 126 |

EXAMPLE 2

The polymerization was repeated essentially as in Example 1 using less potassium fluoride (0.0124 moles) to give a polymer with a reduced viscosity of 1.42 dl/gm. after 3.0 hours reaction time at 320° C. The polymer was compression molded (20 mil) and tested for tensile modulus, tensile strength, elongation and pendulum impact strength according to the procedures of Example 1. Also, the melting point was determined. The results are as follows:

| | |
|---|---|
| Tensile Modulus (psi) | 355,000 |
| Tensile Strength (psi) | 13,000 |
| Elongation (%) | 5 |
| Pendulum Impact Strength (ft-lb/in$^3$) | 102 |
| Tm (°C.) | 333 |

EXAMPLE 3

The polymerization was repeated essentially as in Example 1 using more potassium fluoride (0.12 moles) to give a polymer having a reduced viscosity of 1.7 dl/gm after 0.77 hours reaction time at 320° C.

COMPARATIVE EXAMPLES A TO E; EXAMPLES 4 AND 5

The polymerization of Example 1 was conducted with the alkali metal carbonate and/or alkali metal halide shown in Table I. The reaction time at 320° C. and the reduced viscosities of the polymers produced are shown in Table I.

TABLE I

| Example | Moles Charged | | | | | Ratio K/Na | RV | Reaction Time, hr, @ 320° C. |
|---|---|---|---|---|---|---|---|---|
| | Na$_2$CO$_3$ | K$_2$CO$_3$ | KF | KCl | NaF | | | |
| 1 | .124 | 0 | .03 | 0 | 0 | .121 | 1.85 | 1.25 |
| 2 | .124 | 0 | .0124 | 0 | 0 | .05 | 1.42 | 3.00 |
| 3 | .124 | 0 | .12 | 0 | 0 | .484 | 1.70 | 0.77 |
| Control A | .124 | 0 | 0 | 0 | 0 | 0 | 0.72 | 3.00 |
| Control B | .090 | .0324 | 0 | 0 | 0 | .36 | 1.12 | 2.50 |
| Control C | .108 | .016 | 0 | 0 | 0 | .148 | 1.23 | 1.83 |
| 4 | .124 | 0 | 0 | .03 | 0 | .121 | 1.06 | 2.30 |
| 5 | .124 | 0 | 0 | 0.062 | 0 | .25 | 1.14 | 3.00 |
| Control D | .124 | 0 | 0 | 0 | .030 | 0 | 0.48 | 3.00 |
| Control E | 0 | 0 | .248 | 0 | 0 | — | 0.18 | 3.00 |

The results in Table I are summarized as follows:

Sodium carbonate alone (Control A) gave a lower molecular weight polymer even after three hours reaction time.

The use of a mixture of sodium carbonate and potassium carbonate (Control C) (K/Na=0.148) gave a polymer with a higher reduced viscosity than Control A, i.e., sodium carbonate alone.

Use of potassium fluoride (Example 1) (K/Na=0.121), gave a higher molecular weight in shorter reaction time at 320° C. than Control C. Even at relatively low K/Na ratio (0.05), use of potassium fluoride (Example 2), gave good molecular weight, especially compared to using only sodium carbonate (Control A). Using higher amounts of potassium fluoride (Example 3) gave high molecular weight in very short reaction times.

The use of potassium chloride was not as effective as potassium fluoride, even at higher K/Na ratios as shown in Examples 4 and 5.

The use of sodium fluoride was ineffective or possibly detrimental as shown in Control D.

The use of potassium fluoride alone (without carbonate) gave a very low molecular weight and a dark polymer and the glass reaction flask was severly etched (Control E).

EXAMPLE 6

A polymerization was conducted by the method given in Example 1 using 4,4'-difluoro benzophenone (17.54 gm, 0.0804 mole), 4,4'-dihydroxybiphenyl (13.03 gm, 0.07 mole), 4,4'-dihydroxy diphenylsulfone (2.5 gm, 0.01 mole), sodium carbonate (8.73 gm, 0.0824 mole), and potassium fluoride (0.80 gm, 0.0138 mole) in 90 gm diphenyl sulfone. The reaction mixture was heated to 200° under inert atmosphere, held 30 minutes, heated to 250°, held 1 hour, heated to 290°, held 30 min, and heated at 320°-330° for 3 hours. Isolation and work up as in Example 1 yielded a polymer with reduced viscosity of 1.55.

EXAMPLES 7 TO 12; CONTROL F

The polymerization was repeated essentially as in Example 6 except that the alkali metal carbonate(s) and/or alkali metal halides shown in Table II were used.

TABLE II

| Example | Mole[1] % | | | | | | K/Na | RV |
|---|---|---|---|---|---|---|---|---|
| | BP/Bis-S[2] | DFBP[3] | DCBP[4] | Na$_2$CO$_3$ | K$_2$CO$_3$ | KF | | |
| 6 | 87.5/12.5 | 100.5 | — | 103 | — | 17.25 | 0.084 | 1.55 |
| Control F | 87.5/12.5 | 100 | — | 95 | 8.38 | — | 0.088 | 1.40 |

TABLE II-continued

| Example | Mole[1] % BP/Bis-S[2] | DFBP[3] | DCBP[4] | Na$_2$CO$_3$ | K$_2$CO$_3$ | KF | K/Na | RV |
|---|---|---|---|---|---|---|---|---|
| 7 | 87.5/12.5 | 100.5 | — | 101 | — | 17.30 | 0.086 | 1.85 |
| 8 | 85/15 | 100.5 | — | 101 | — | 17.30 | 0.086 | 2.62 |
| 9 | 85/15 | 102.7 | — | 102 | — | 17.30 | 0.085 | 1.75 |
| 10 | 85/15 | 103 | — | 102 | — | 17.30 | 0.085 | 1.63 |
| 11 | 85/15 | 103.2 | — | 102 | — | 17.30 | 0.085 | 1.49 |
| 12 | 87.5/12.5 | — | 101 | 101 | — | 16.88 | 0.084 | 2.24 |

[1]Stoichiometry based on moles of bisphenol used
[2]BP = biphenol
Bis-S = dihydroxydiphenyl sulfone
[3]DFBP = difluoro benzophenone
[4]DCBP = dichloro benzophenone

EXAMPLES 13 TO 16 AND CONTROLS G TO I

The polymerization was repeated essentially as in Example 1 using 0.96 moles of difluorobenzophenone and 1.02 moles of carbonate per mole of hydroquinone to prepare oligomers. The reaction was conducted at 200° C. for thirty minutes, 250° C. for one hour and then at 270° C. for the time shown in Table III using the appropriate amounts of potassium carbonate/sodium carbonate and potassium fluoride/sodium carbonate shown in Table III.

TABLE III

| | Oligomer RV | |
|---|---|---|
| Time (hr) | K$_2$CO$_3$/Na$_2$CO$_3$ K/Na = 0.33 | KF/Na$_2$CO$_3$ K/Na = 0.125 |
| 1 | — | 0.25 (Example 13) |
| 2 | 0.45 (Control G) | 0.53 (Example 14) |
| 4 | 0.52 (Control H) | 0.42 (Example 15) |
| 22.5 | 0.38 (Control I) | 0.41 (Example 16) |

The maximum and final oligomer molecular weight was achieved in about one half the reaction time using the mixture of potassium fluoride and sodium carbonate than the Controls which used a mixture of potassium carbonate and sodium carbonate. This is true even though the K/Na ratio in the Examples is much lower than in the Controls.

What is claimed is:

1. An improved process for preparing poly(aryl ether ketone)s by reacting a mixture of at least one bisphenol and at least one dihalobenzenoid compound, or a halophenol, wherein the improvement comprises providing to the reaction a combination of sodium carbonate and/or bicarbonate and an alkali metal halide selected from potassium, rubidium or cesium fluoride or chloride, or combinations thereof.

2. A process as defined in claim 1 wherein the sodium carbonate or bicarbonate and alkali metal halide are used such that from about 1 to about 1.2 atoms of sodium and from 0.001 to about 0.5 atoms of alkali metal are used for each phenol group.

3. A process as defined in claim 1 which is conducted at a temperature of from about 100° C. to about 400° C.

4. A process as defined in claim 1 wherein the bisphenol is of the following formula:

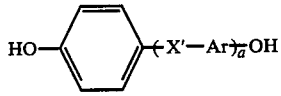

wherein X' is independently O,

SO$_2$, or a direct bond, Ar is independently a divalent radical selected from phenylene, biphenylene or naphthalene, and a is 0 to 6.

5. A process as defined in claim 4 wherein the bisphenol is selected from hydroquinone, 4,4'-dihydroxybiphenyl, 4,4'-dihydroxybenzophenone, 4,4'-dihydroxydiphenyl ether, 4,4'-dihydroxydiphenyl sulfone and 4,4'-bis(4-hydroxyphenylsulfonyl)biphenyl.

6. A process as defined in claim 1 wherein the dihalobenzenoid compound is of the following formula:

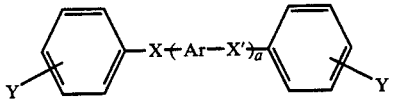

wherein Y is halogen, X and X' are independently O,

SO$_2$, or a direct bond, Ar is independently a divalent radical selected from phenylene or biphenylene, with the proviso that X or X' ortho or para to the Y's is

or SO$_2$, and a is 0 to 6.

7. A process as defined in claim 6 wherein the dihalobenzenoid compound is selected from 4,4'-difluorobenzophenone, 4,4'-dichlorobenzophenone, 4,4'-bis(4-fluorobenzoyl)benzene, 4,4'-bis(4-chlorobenzoyl)benzene, and 4,4'-dichlorodiphenyl sulfone.

8. A process as defined in claim 1 wherein the halophenol is of the following formula:

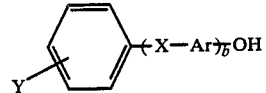

wherein Y is halogen, X is independently O,

SO$_2$, or a direct bond, Ar is independently selected from phenylene or biphenylene, with the proviso that X ortho to parato Y is

or SO$_2$, and b is 0 to 3.

9. An improved process for preparing poly(aryl ether ketone)s by reacting a mixture of at least one bisphenol and at least one dihalobenzenoid compound, or a halophenol, wherein the improvement comprises providing to the reaction a combination of sodium carbonate and/or bicarbonate and potassium fluoride.

10. A process as defined in claim 9 wherein the sodium carbonate or bicarbonate and potassium fluoride are used such that the ratio of potassium to sodium is from about 0.001 to about 0.50.

11. A process as defined in claim 10 wherein the ratio of potassium to sodium is from about 0.01 to about 0.25.

* * * * *